(12) United States Patent
Enomoto

(10) Patent No.: US 7,289,664 B2
(45) Date of Patent: Oct. 30, 2007

(54) METHOD OF DETECTING AND CORRECTING THE RED EYE

(75) Inventor: Jun Enomoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 542 days.

(21) Appl. No.: 10/345,407

(22) Filed: Jan. 16, 2003

(65) Prior Publication Data

US 2003/0142285 A1 Jul. 31, 2003

(30) Foreign Application Priority Data

Jan. 17, 2002 (JP) ............................ 2002-008354

(51) Int. Cl.
*G06K 9/00* (2006.01)
(52) U.S. Cl. .................. 382/167; 382/162; 382/163
(58) Field of Classification Search ........... 382/167, 382/162, 163, 358, 518, 520
See application file for complete search history.

(56) References Cited

U.S. PATENT DOCUMENTS 5,990,973 A * 11/1999 Sakamoto .................. 348/576
6,631,208 B1 * 10/2003 Kinjo et al. ................ 382/167
6,798,903 B2 * 9/2004 Takaoka ..................... 382/167

FOREIGN PATENT DOCUMENTS

| JP | 05-019382 A | 1/1993 |
| JP | 2000-076427 A | 3/2000 |
| JP | 2000-137788 A | 5/2000 |
| JP | 2000-148980 A | 5/2000 |
| JP | 2000-149018 A | 5/2000 |
| JP | 2001-186325 A | 7/2001 |

OTHER PUBLICATIONS

Japanese Office Action issued Nov. 7, 2006 in Japanese Patent Application No. 2003-009621.

* cited by examiner

Primary Examiner—Matthew C. Bella
Assistant Examiner—Tom Y Lu
(74) Attorney, Agent, or Firm—Sughrue Mion, PLLC

(57) ABSTRACT

The red eye detecting and correcting method detects red eye that occurred in an image during photographing and correcting the thus detected red eye to a specified color of pupil. Parameters employed in red eye detection and correction are altered in accordance with at least one of conditions as follows: type of the image, a camera model with which the image was recorded, a processing space for image data on the image, image processing steps to which the image is to be subjected before red eye detection and correction, format of the image, and scan condition.

12 Claims, 4 Drawing Sheets

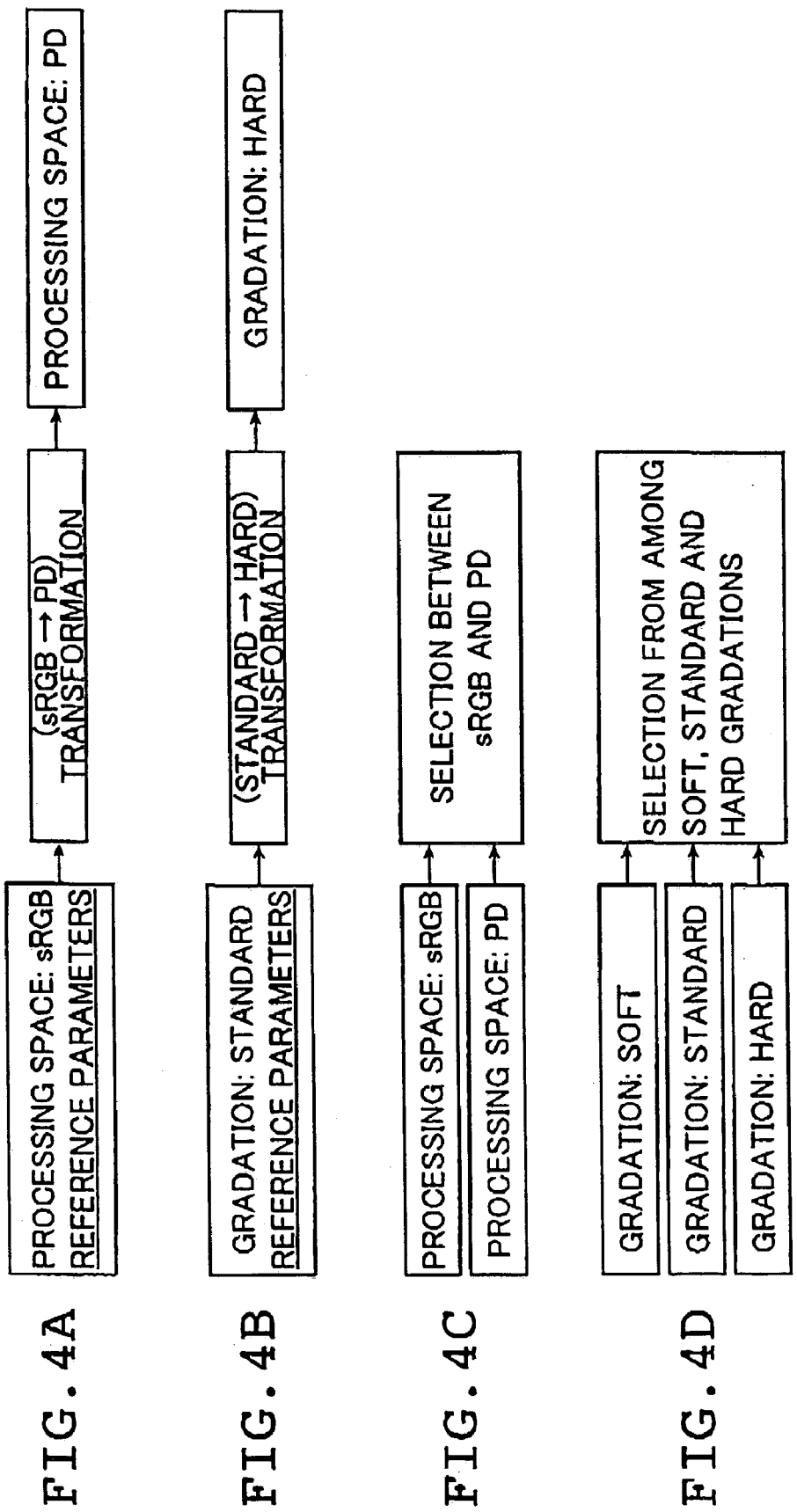

METHOD OF DETECTING AND CORRECTING THE RED EYE

BACKGROUND OF THE INVENTION

This invention relates to a method of detecting the red eye that occurred in an image during photographing so as to correct the red eye and correcting the detected red eye to a specified color of pupil.

When a person is photographed with a camera, particularly when it is pointed direct at the person at night with the aid of an electronic flash, the pupils of the person will come out red or golden. This phenomenon, commonly called the red-eye effect, occurs since the burst of the flash which comes direct into the pupils that dilate in a dark area is reflected direct back to the film to create an undesirable image. The red-eye effect comes about in two ways, one producing red pupils and the other golden pupils (on the pages that follow, the two cases are collectively referred to as "red eye").

In order to reduce the pupil dilation which can cause red eye, there has been developed a camera with a built-in electronic flash having a capability for firing a series of low-intensity bursts before the main full-intensity burst upon photographing. However, this approach is incapable of completely preventing the red-eye effect and it further involves serious problems such as producing unnatural facial expressions due to the stroboscopic series and requiring a special mechanism for firing pre-flash bursts.

As alternatives, various methods have been recently proposed with a view to preventing red eye from occurring in a reproduced image by digital image processing techniques.

Methods of correcting red eye and methods basic to them which can extract a principal subject such as face or red-eye areas from the image are disclosed in a lot of patents including JP 2000-76427 A, JP 2000-148980 A, JP 2000-137788 A and JP 2000-149018 A.

The method disclosed in JP 2000-76427 A comprises the steps of dividing the image area into a plurality of regions having peaked distribution shapes on the basis of a color value as an extraction element which is obtained from hue, saturation and lightness, calculating a characteristic quantity for the image of a designated outline of the eye in a plurality of positions, extracting the image of the pupil on the basis of the values of the obtained characteristic quantities and applying a corrective measure for the red-eye effect.

According to the method disclosed in JP 2000-148980 A, even when the density of an image region corresponding to a human face is deviated to either the higher or lower side as in a scene taken under back light or with an electronic flash going off, the region corresponding to the human face is identified with high precision and the extracted face region is utilized in image processing, such as correction of the red-eye effect, that is applied to the face region or only a portion of it.

The method disclosed in JP 2000-137788 A comprises the steps of extracting a candidate face region presumably corresponding to a human face from the image to be processed, dividing the candidate face region into a specified number of blocks, calculating the integral value of edge intensity for each block along the vertical axis of the image and using the characteristic quantity calculated for each block so as to ensure that the region corresponding to the human face is extracted with high precision by simple processing based on the internal structure of the human face.

The method disclosed in JP 2000-149018 A comprises the steps of extracting a plurality of candidate face regions presumably corresponding to a human face on the basis of image data about the image to be processed, calculating the degree of overlap for a pair of overlapping candidate face regions, setting a weighting score for each of the candidate face regions overlapping other candidate face regions such that said weighting score satisfies specified conditions, and comparing said weighting score with a threshold value, whereby the effect of erroneously extracting the region presumably corresponding to the principal part of the image is reduced to ensure extraction of the actual face region from the candidate face regions.

These prior art face extracting and red-eye correcting methods have achieved the intended results on predetermined subjects. However, image inputting involves diverse types of input images (diverse input types) such as from negative film, positive film or digital camera and input from a digital camera differs from input from films such as negatives or positives in terms of the processing space for image data (processing region), the image format determined by bit depth, the scan condition, or the like; this has prevented the performance of unified processing, causing a problem with processing efficiency.

SUMMARY OF THE INVENTION

The present invention has been accomplished under these circumstances and it has an object of providing a method of detecting and correcting the red eye with enhanced efficiency by performing unified processing in red eye detection and correction irrespective of the difference in type of an input image (input type), that is to say, whether an input image is from a digital camera or from a film such as negative or positive film.

In order to attain the above-mentioned object, the first aspect of the present invention provides a red eye detecting and correcting method, comprising detecting red eye that occurred in an image during photographing and correcting the thus detected red eye to a specified color of pupil, wherein parameters employed in red eye detection and correction are altered in accordance with at least one of conditions as follows: type of the image, a camera model with which the image was recorded, a processing space for image data on the image, image processing steps to which the image is to be subjected before red eye detection and correction, format of the image, and scan condition.

Similarly, in order to attain the above-mentioned object, the second aspect of the present invention provides the red eye detecting and correcting method, comprising detecting red eye that occurred in an image during photographing and correcting the thus detected red eye to a specified color of pupil, wherein parameters employed in red eye detection and correction are altered in accordance with a combination of two or more of the conditions as follows: type of the image, a camera model with which the image was recorded, a processing space for image data on the image, image processing steps to which the image is to be subjected before red eye detection and correction, format of the image, and scan condition.

Preferably, reference parameters are provided as the parameters, and the parameters to be altered are obtained from the reference parameters by transformation based on one of the conditions or a combination of two or more of the conditions.

And, preferably, parameters corresponding to all the conditions and all combinations of the conditions are previously provided as the parameters, and parameters corresponding to one of the conditions or a combination of two or more of the conditions are selected as the parameters to be altered.

Alternatively, when a part of the conditions or a part of combinations of the conditions are adopted more frequently than another part of the conditions or another part of the combinations of the conditions, parameters corresponding to all the part of the conditions and all the part of the combinations of the conditions are preferably provided as the parameters, and parameters corresponding to one among the part of the conditions or one among the part of the combinations of the conditions are selected as the parameters to be altered, and reference parameters for another part of the conditions or another part of the combinations of the conditions are provided as the parameters, and the parameters to be altered are obtained from the reference parameters by transformation based on one among another part of the conditions or one among another part of the combinations of the conditions.

BRIEF DESCRIPTION OF THE DRAWINGS

FIGS. 4A to 4D show various examples of parameter alteration in the red eye detecting and correcting method of the invention.

THE PREFERRED EMBODIMENTS OF THE INVENTION

The red eye detecting and correcting method according to the present invention is described below in detail with reference to the preferred embodiments illustrated in the accompanying drawings.

Figure 1:
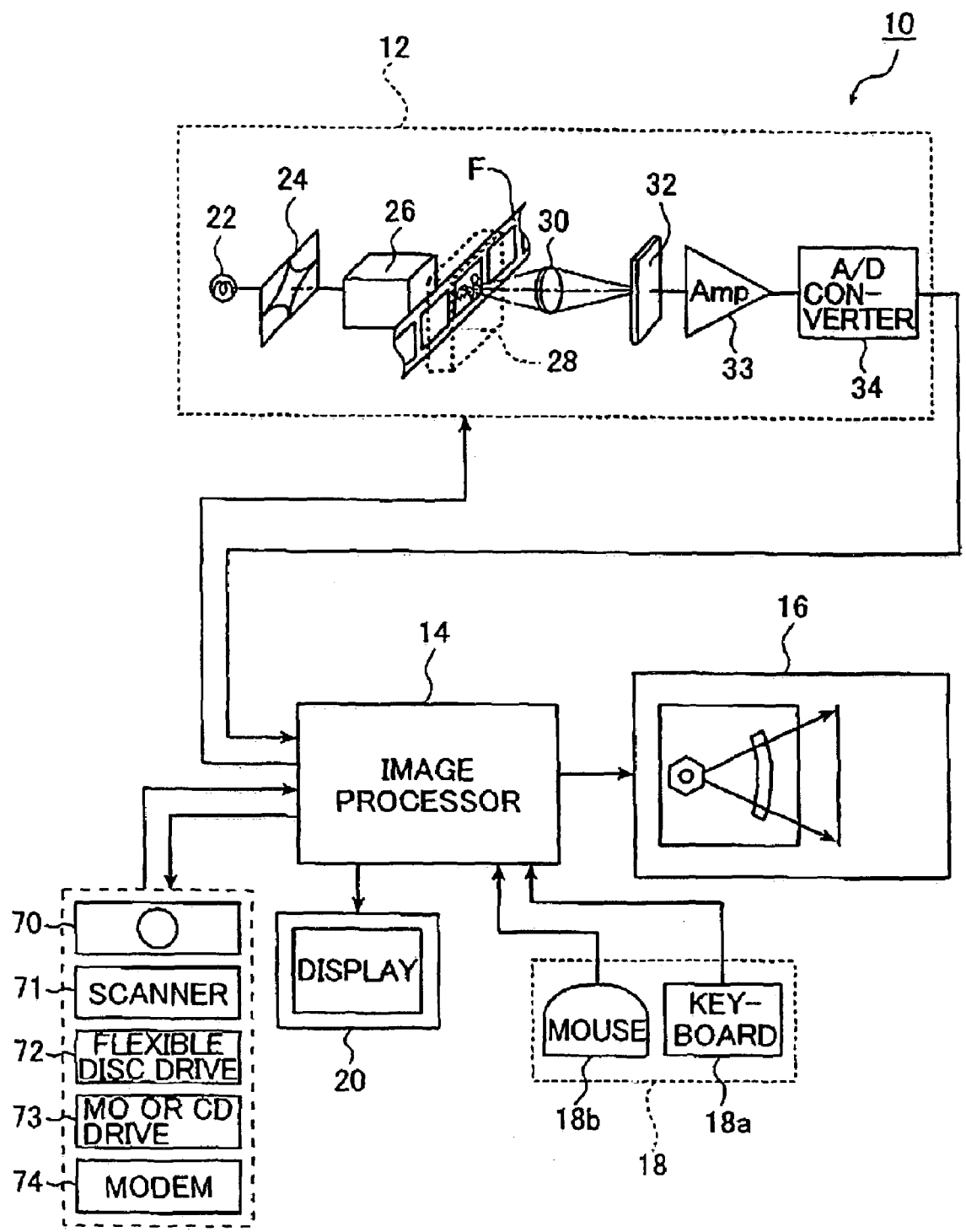
FIG. 1 is a block diagram showing diagrammatically an embodiment of a digital photoprinter designed to perform image processing including the red eye detecting and correcting method of the invention.

FIG. 1 is a block diagram showing diagrammatically an embodiment of a digital photoprinter designed to perform image processing including the red eye detecting and correcting method of the invention.

The digital photoprinter generally indicated by 10 in FIG. 1 (which is hereunder referred to simply as "photoprinter") comprises basically a scanner (image reader) 12 for photoelectrically reading the image recorded on a film F, an image processor 14 that implements the red eye detecting and correcting method according to the invention and performs various image processing steps on the image data (image information) captured with the scanner 12 and with which the photoprinter 10 as a whole is manipulated and controlled, and an image recorder 16 that performs imagewise exposure of a light-sensitive material (photographic paper) with light beams modulated in accordance with the image data delivered from the image processor 14 and which performs development and other necessary processing to output a (finished) image as a print.

Connected to the image processor 14 are a manipulating unit 18 having a keyboard 18a and a mouse 18b for inputting and setting various conditions, selecting and commanding a specific processing step and entering a command and so forth for executing the red eye detecting and correcting method in order to correct the red-eye effect, as well as a monitor 20 for representing the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 26 which diffuses the reading light incident on the film F so that it becomes uniform across the plane of the film F, a carrier 28 of the film F, an imaging lens unit 30, an image sensor 32 provided with a 3-line CCD sensor capable of reading R (red), G (green) and B (blue) color image densities, an amplifier (Amp) 33 and an A/D (analog-to-digital) converter 34.

In the photoprinter 10, dedicated carriers 28 are available that can be detachably mounted on the body of the scanner 12 in accordance with the type or the size of the film F (e.g. whether it is a film of the Advanced Photo System (APS) or a 135-size negative or reversal film), the format of the film (e.g. whether it is a strip or a slide) or other factor. By interchanging carriers 28, the photoprinter 10 can be adapted to process various kinds of films in various modes. The images (frames) that are recorded on the film and which are subjected to the necessary procedure for print production are transported to and held in a specified reading position by means of the carrier 28.

As is well known, magnetic recording media are preliminarily formed on an APS film and they have had various kinds of information written thereto such as cartridge ID and film type. In addition, various kinds of data including the date of photographing and the date of developing the film, as well as the camera and developer models can be written to those magnetic recording media when photographing, developing the film, etc. The carrier 28 adapted to handle the APS film (cartridge) is equipped with a means of reading such magnetic information and as the film is transported to the reading position, said means reads various kinds of magnetic information and send them to the image processor 14.

The images recorded on the film F are captured with the scanner 12 in the following manner: the reading light from the light source 22 has its quantity adjusted by means of the variable diaphragm 24 and rendered uniform by passage through the diffuser box 26; the light is then incident on the film F held in the specified reading position by means of the carrier 28 and thereafter passes through the film F to produce projection light bearing the image recorded on the film F.

The illustrated carrier 28 is adapted to handle strips of film F such as 24-exposure 135-size films and APS cartridges. As the film F is set in the specified reading position, the carrier 28 transports it, typically in an auxiliary scanning direction which is perpendicular to the main scanning direction (i.e., the direction in which the RGB 3-line CCD sensor extends) of the image sensor 32 with its length being parallel to the auxiliary scanning direction. Being held in the reading position, the film F is transported in the auxiliary scanning direction by means of the carrier 28 as it is illuminated with the reading light. Consequently, the film F is subjected to two-dimensional slit scan with the reading light passing through the slit (not shown) which extends in the main scanning direction, whereupon the image of each frame recorded on the film F is captured.

The projection light from the film F is focused on the light-receiving plane of the image sensor 32 by the imaging lens unit 30 to form a sharp image.

The image sensor 32 is typically a 3-line color CCD sensor comprising a line CCD sensor for reading an R image, a line CCD sensor for reading a G image and a line CCD sensor for reading a B image. As already mentioned, the respective line CCD sensors extend in the main scanning direction. The projection light from the film F is separated into three primary colors R, G and B and captured photoelectrically by means of the image sensor 32.

The R, G and B output signals from the image sensor 32 are amplified with the Amp 33 and sent to the A/D converter 34, where they are each converted to RGB digital image data, typically 12-bit data and from thence are output to the image processor 14.

In the scanner 12, the images recorded on the film F are captured by two scans, prescan at low resolution (the first image reading) and fine scan for obtaining output image data (the second image reading).

Prescan is performed under preset reading conditions that ensure that all kinds of image on the film F to be handled by the scanner 12 can be read without saturating the image sensor 32. Fine scan uses the prescanned data and is performed under reading conditions that are set for each frame such that the image sensor 32 is saturated at a slightly lower density than the minimum density of the image (frame) of interest. The output image signals from prescan and fine scan modes are essentially the same image data except for resolution and output image signal level.

It should be noted that the scanner 12 for use in the photoprinter 10 is by no means limited to a type that relies upon the slit scan reading technique described above and it may be of a type that relies upon areal reading, or a technique by which the entire image in one frame is scanned at a time. In this alternative approach, an area sensor such as an area CCD sensor may be used with a means for inserting R, G and B color filters between the light source 22 and the film F. One color filter is inserted in the optical path of light emerging from the light source 22 and the entire surface of the film F is illuminated with the reading light passing through the color filter so that the light passing through the film is focused on the area CCD sensor to read the entire image on the film F. This procedure is repeated for the R, G and B color filters that are sequentially inserted to capture the image on the film F as separated into the three primary colors.

The color image signals to be input into the image processor 14 are not limited to the scanned image data that are obtained by the above-described reading of the light passing through the film. Other kinds of external data may be input, as exemplified by image data captured by photographing with a digital camera 70, image data captured by reading an original (e.g. of a light-reflective nature) with a flat-bed type scanner 71, image data that was generated in another computer and which was recorded in a flexible disc drive 72 or an MO drive or CD drive 73, and communication image data received via a modem 74 (these kinds of data are hereunder collectively referred to as "file image data").

Figure 2:
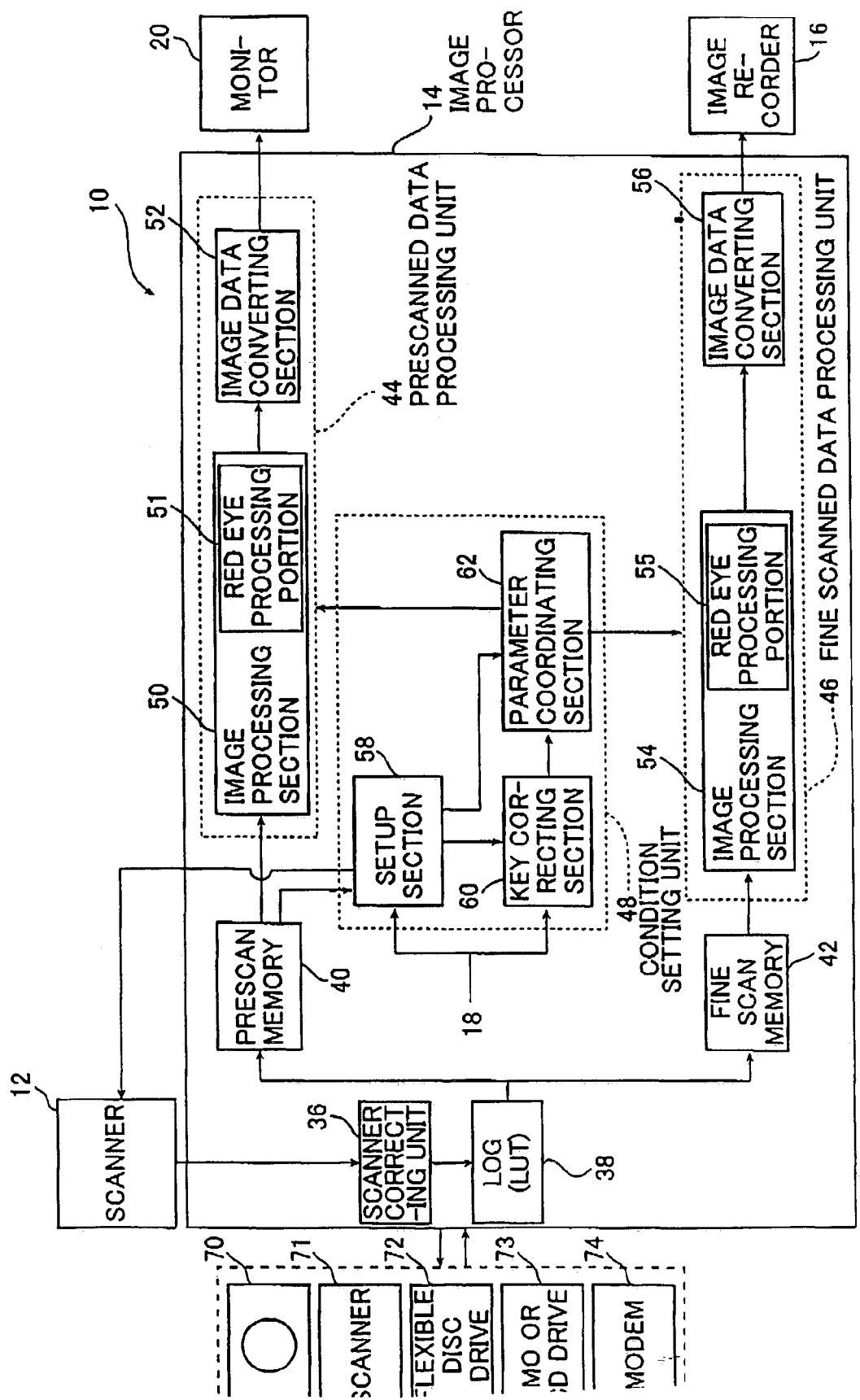
FIG. 2 is a block diagram showing diagrammatically the configuration of the image processor in FIG. 1.

FIG. 2 is a block diagram of the image processor 14 (which is hereunder referred to simply as processor 14). The processor 14 is a component for implementing the red eye detecting and correcting method of the invention and comprises a scanner correcting unit 36, a LOG converter 38, a prescan (frame) memory 40, a fine scan (frame) memory 42, a prescanned data processing unit 44, a fine scanned data processing unit 46 for performing various image processing steps, and a condition setting unit 48.

FIG. 2 shows only the sites related to image processing and besides these sites, the processor 14 includes a CPU for controlling and managing the overall operation of the photoprinter 10 including the processor 14, and memories for storing the information necessary for the operation and otherwise of the photoprinter 10. The manipulating unit 18 and the monitor 20 are connected to related sites via the CPU and the like (CPU bus).

The R, G and B image signals, for example, 12-bit digital image data, as supplied to the processor 14 from the scanner 12 enter the scanner correcting unit 36. The scanner correcting unit 36 corrects pixel-to-pixel variations in the sensitivity of RGB digital image data and dark current that are due to the 3-line CCD sensor in the image sensor 32 in the scanner 12 and to this end, it performs various corrections of scanned image data such as DC offset correction, dark correction, defective pixel correction and shading correction. The digital image signals that have been corrected for the pixel-to-pixel sensitivity variations, dark current, etc. in the scanner correcting unit 36 are output to the LOG converter 38.

The LOG converter 38 performs logarithmic conversion on the supplied digital image data such that it undergoes gradation conversion to give digital image density data. To this end, a look-up table (LUT) is typically used and the 12-bit digital image data corrected in the scanner correcting unit 36 is transformed to digital image density data, say, 10-bit (0 to 1023) data.

The digital image density data obtained by transformation in the LOG converter 38 is stored in the prescan memory 40 if it is prescanned image data; in the case of fine scanned image data, it is stored in the fine scan memory 42.

The prescan memory 40 is a frame memory in which the low-resolution image density data for one full frame of the film F that was obtained by prescan of the film F with the scanner 12 and which has been subjected to various data corrections and logarithmic conversion is to be stored for each of the colors R, G and B. The prescan memory 40 should at least have a capacity for storing the image density data for the three primary colors (RGB) in one frame of the film F; alternatively, it may have a capacity for storing the image density data for more than one frame or it may comprise a multiple of memories each having a capacity for one frame.

The prescanned image data stored in the prescan memory 40 is read into the prescanned data processing unit 44.

The fine scan memory 42 is a frame memory in which the high-resolution image density data for one full frame of the film F that was obtained by fine scan of the film F with the scanner 12 and which has been subjected to various data corrections and logarithmic conversion is to be stored for each of the colors R, G and B. The fine scan memory 42 has preferably a capacity to store the image density data for the three primary colors (RGB) concerning the images in at least two frames of the film F, so that while the image density data for one frame is being written to the fine scan memory 42, the image density data for the other frame is read into the fine scanned data processing unit 46 and subjected to various image processing steps. Alternatively, the fine scan memory 42 may have a capacity to store the image density data for one frame so that one frame is handled at a time. If desired, the fine scan memory 42 may be of such a type that it has a multiple of memories with a capacity for one frame and can be used as a toggle memory.

The fine scanned image data stored in the fine scan memory 42 is read into the fine scanned data processing unit 46.

The prescanned image data stored in the prescan memory 40 is sent to the prescanned data processing unit 44 where it is subjected to the various image processing steps that are necessary to provide a display on the monitor 20. The prescanned data processing unit 44 comprises both an image processing section 50 having a red eye processing portion 51 for implementing the red eye detecting and correcting method of the invention and an image data converting section 52.

The image processing section 50 is a site where the image data that was captured with the scanner 12 and stored in the prescan memory 40 is subjected to specified image processing steps in accordance with the image processing conditions that are set by means of the condition setting unit 48 to be described later so that a color image of desired quality can be reproduced on the CRT display screen of the monitor 20 which is also to be described later. Examples of the specified image processing steps to be performed include color balance adjustment, gradation correction, brightness correction, saturation adjustment (hypertoning), hypersharpening, color transformation and density conversion and such steps are carried out by processing with look-up tables (hereunder represented by LUTs) and matrix (hereunder represented by MTX) operations. The image processing section 50 also performs red eye correction in the red eye processing portion 51 as described later, thereby generating image data having the desired display quality such that the pupils have been corrected to their natural color.

The image data converting section 52 is a site where the image data processed by the image processing section 50 is thinned out as required in order to have matching with the resolution of the monitor 20 and similarly converted by means of a 3D (three-dimensional) LUT or the like into image data that corresponds to the display on the monitor 20 and which is subsequently displayed on the monitor 20.

The conditions for the processing to be done in the image processing section 50 are set in the condition setting unit 48 which is described later.

The fine scanned image data stored in the fine scan memory 42 is sent to the fine scanned data processing unit 46 where it is subjected to the various image processing steps that are necessary for outputting it as a color print from the image recorder 16. The fine scanned data processing unit 46 comprises both an image processing section 54 having a red eye processing portion 55 for implementing the red eye detecting and correcting method of the invention and an image data converting section 56.

The image processing section 54 is a site where the image data that was captured with the scanner 12 and stored in the fine scan memory 42 is subjected to specified image processing steps in accordance with the image processing conditions that are set by means of the condition setting unit 48 to be described later so that an image can be reproduced on color paper as a color print having the desired density, gradation and tone. To this end, the image processing section 54 performs various image processing steps, such as color balance adjustment, gradation adjustment, color adjustment, density adjustment, saturation adjustment, electronic scaling and sharpness enhancement (edge enhancement and sharpening), on the image data by means of LUTs, MTX operators, low-pass filters, adders/subtractors, etc. The image processing section 54 also performs red eye correction in the red eye processing portion 55 in a manner whose details will be given later, thereby generating output image data after the pupils having the red-eye effect are corrected to their natural color.

The image data converting section 56 is a site where the image data processed by the image processing section 54 is converted by means of a standard gradation look-up table such as 3D LUT or the like into image data that corresponds to the image recording with the image recorder 16 and which is subsequently supplied to the image recorder 16.

The image recorder 16 outputs a finished print that has the color image reproduced on the basis of the image data being output from the fine scanned data processing unit 46.

The conditions for the processing to be done in the image processing section 54 are also set in the condition setting unit 48.

The condition setting unit 48 sets the conditions for the various image processing schemes to be done in the fine scanned data processing unit 46. The condition setting unit 48 comprises a setup section 58, a key correcting section 60 and a parameter coordinating section 62.

The setup section 58 uses the prescanned image data and the like in order to set the reading conditions for fine scan and supplies them to the scanner 12; in addition, the setup section 58 constructs (or calculates) the conditions for the image processing steps to be done in the prescanned data processing unit 44 and the fine scanned data processing unit 46 and supplies them to the parameter coordinating section 62.

Specifically, the setup section 58 reads the prescanned image data from the prescan memory 40 and uses it to construct density histograms and calculate various image characteristic quantities such as average density, LATD (large-area transmission density), highlights (minimum density) and shadows (maximum density). On the basis of the calculated image characteristic quantities, the reading conditions for fine scan such as the quantity of light from the light source 22, the stop value of the variable diaphragm 24 and the accumulation time of the image sensor 32 are so set that the image sensor 32 will be saturated at a slightly lower density than the minimum density of the image of interest.

The reading conditions for fine scan may vary from those for prescan in such a manner that all the elements that correspond to the output level of the image sensor are altered, or that only one element such as the stop value of the variable diaphragm 24 is altered, or that a plurality of elements such as the stop value and the accumulation time are altered.

Further, in response to the density histograms and image characteristic quantities, as well as commands and the like that are entered by the operator as required, the setup section 58 sets the conditions for color balance adjustment, gradation adjustment and various other image processing schemes as described before. The image processing conditions to be set are preferably involved with either color or density or both.

The key correcting section 60 calculates the amounts of adjustment of image processing conditions (e.g. the amount of correction of LUTs) typically in accordance with the amounts of adjustment in density (brightness), color, contrast, sharpness and saturation that have been set by means of the keyboard 18a and keys (not shown) on the manipulating unit 18, as well as with various commands entered by means of the mouse 18b; the key correcting section 60 then sets parameters and supplies them into the parameter coordinating section 62.

After receiving the image processing conditions that have been set by the setup section 58, the parameter coordinating section 62 sets them in the image processing section 50 of the prescanned data processing unit 44 and in the image processing section 54 of the fine scanned data processing unit 46. Further, in accordance with the amounts of adjustment calculated by the key correcting section 60, the parameter coordinating section 62 either corrects (adjusts) the image processing conditions preliminarily set in the respective sections or makes another setting of image processing conditions.

The image processing section 50 of the prescanned data processing unit 44 and the image processing section 54 of the fine scanned data processing unit 46 have the red eye processing portions 51 and 55, respectively, in which the pupils having the red-eye effect are corrected to their natural color after those sections have performed the above-described various processing steps.

Described below in detail is the procedure of red eye correction to be performed by the red eye correcting portions 51 and 55, namely, the method of detecting the region to be corrected for the red-eye effect and correcting the red eye in accordance with the present invention.

Figure 3:
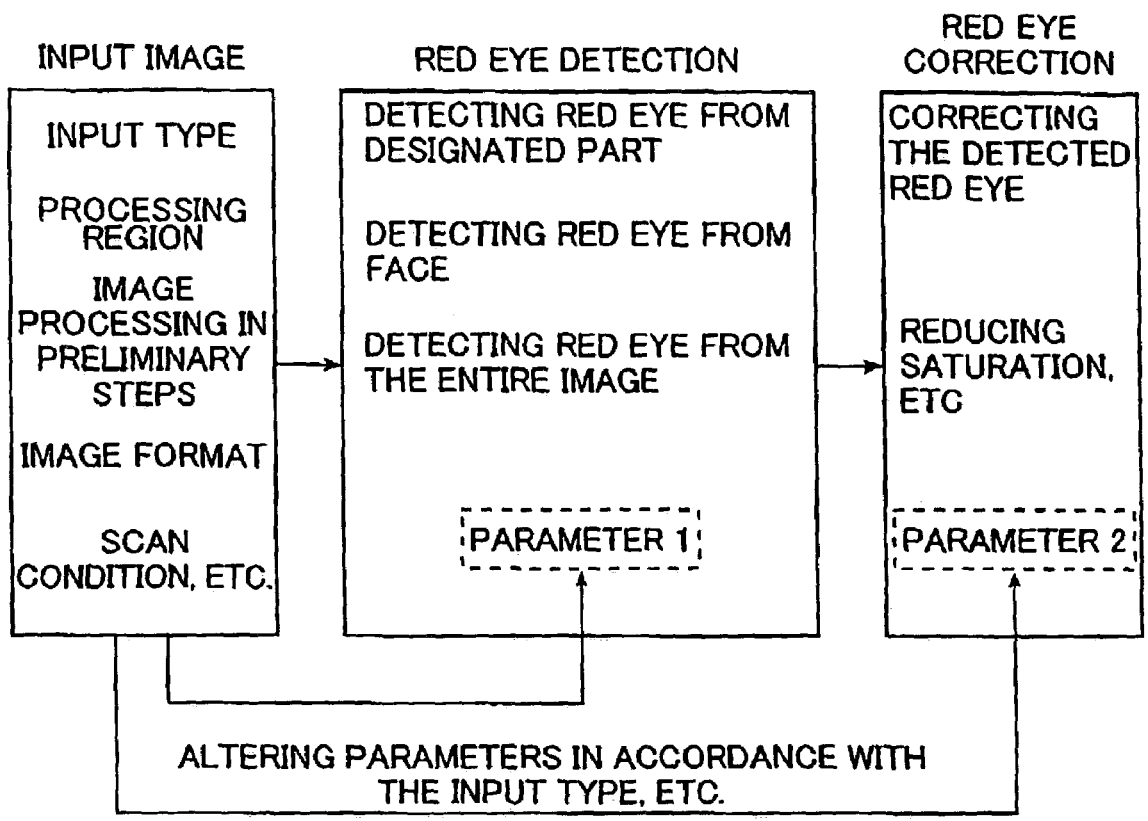
FIG. 3 is a schematic representation of an outline for the red eye detecting and correcting method of the invention.

FIG. 3 shows an outline for the method of detecting and correcting the red eye in accordance with the invention. As shown in this figure, the invention alters the parameters for red eye detection and correction in accordance with such conditions as the type of the input image with the red eye occurred therein (input type), the camera model with which the input image was produced, the processing space for the image data on the input image (processing region), the image processing steps to which the input image is to be subjected before red eye detection and correction (image processing in preliminary steps), the format of the input image, and the scan condition. As a result, red eye detection and correction can be performed in a unified way despite changes in such various conditions as the input type, the camera model, the processing space, the image processing in preliminary steps, the image format and the scan condition.

The input type and so forth as referred to above are not the sole conditions in accordance with which the parameters for red eye detection and correction are to be altered; other conditions that can be used include CCD format and light source type. Examples of the CCD format include a honeycomb CCD and the non-honeycomb conventional CCD. The parameters may be altered in accordance with CCD format since it has a potential to change the boundary (search range), pixel profile, etc. Examples of the light source type include an LED and a halogen lamp. The parameters may be altered in accordance with light source type since it has a potential to change the color tint.

It should be noted that the parameters for red eye detection and correction may be altered in accordance with the camera model since it has a potential to generate the red eye more easily and change the degree of the red eye.

The type of the input image data supplied to the image processor 14, its format and method of processing it are in various kinds. For example, the input type which represents the type of an input image may be exemplified by the image recorded on a negative or positive film as photographed with a conventional silver halide camera, as well as the digital image data captured with a digital imaging device such as a digital camera. The camera model may be exemplified by a single-lens reflex camera, a twin-lens reflex camera, a compact camera, a one-shot camera, and even the variations of the respective cameras. The color space for processing the image data, namely the processing space for image data (processing region), may be exemplified by sRGB which is a color reproduction standard specification and machine-specific print data (PD).

The image processing in preliminary steps or the image processing steps to be performed before red eye detection and correction may be exemplified by gradation processing such as gradation softening or hardening. Examples of the image format include the format and the number of bits; examples of the scan condition include the number of times pixels are offset and coordination.

As will be described later, the present invention alters the parameters for red eye detection and correction in accordance with such conditions as above, taken either individually or in combination.

The input image data is subjected to image processing in preliminary steps in the image processing section 50 and 54 and then subjected to red eye detection and correction in the red eye processing portion 51 and 55.

Red eye detection may be performed by detecting the red-eye effect from within a designated part or from a face or from the entire image. Red eye detection may be performed either automatically or by the operator who manually designates the necessary operating elements from the key correcting section 60. The operator may alter and set the parameters for red eye detection and correction from the key correcting section 60 in accordance with such conditions as the input type, the camera model, the processing space, the image processing in preliminary steps, the image format and the scan condition. If desired, some of the conditions may be combined and the parameters altered in accordance with such combinations.

Designation of the red-eye region as a step in the method of detecting the red-eye effect may also be performed by the following various ways. In one way, a part including both eyes and their surroundings is enclosed with a rectangular box by means of the mouse 18b or the keyboard 18a so that the part within the box is designated. The box is not limited to a rectangle and may be in other shapes including an ellipse. In an alternative way, the centers of the pupils of both eyes may be designated by means of the mouse 18b or the keyboard 18a so as to designate a part including both eyes and their surroundings. In yet another method, a part including one eye, not both eyes, and its surroundings may be designated by enclosing it with a rectangular or elliptical box. If desired, setting may be performed in such a way that by designating the center of an eye and the position of a box that is formed to include the entire eye, a box including one eye is formed automatically on the basis of a proportion obtained statistically from the position of the box relative to the center of the eye and the part within the box is designated as the part to be subjected to red eye correction. In yet another method, setting may be performed in such a way that by designating either the center of an eye or its surroundings at one point, a box of default size including the entire eye is automatically formed so that the part within the box is designated.

If desired, a part including an eye and its surroundings may be enclosed with a box that is generated as if it were handwritten by means of the mouse 18b or on the keyboard 18a so as to designate the part within the box.

With the part to be subjected to red eye correction having been designated by any one of the methods described above, a characteristic quantity of that part is calculated in the next step. The characteristic quantity to be calculated is not limited in any particular way; however, in the embodiment under consideration, a color value obtained from hue, saturation and lightness is chosen as the element to be extracted and such a characteristic quantity is selected that enables the image of a pupil or pupils to be cut out as a single entity. If depicted in a graph, the selected characteristic quantity presents peaked waves in the regions that correspond to such respective constituents of the image as the white of the eye, the pupil and the skin. Depending on which characteristic quantity is selected, a red-eye region including a catchlight forms a peak whereas the iris adjacent to the white of the eye or the skin forms a valley, thus presenting the boundary between two regions to be divided.

For each of the regions thus divided from one another, the shape, the position relative to other regions, the percentage area, the density and the average color tint are checked and the region that is the most characteristic of the pupil is chosen as the red-eye region, whereby red eye detection is accomplished.

If two or more regions in the image of one eye are chosen as red-eye regions, they are evaluated with respect to the shape, the position relative to other regions, the percentage area, the density and the average color tint and the region that has the highest rating is chosen as the red-eye region.

Evaluation may be performed by a variety of methods. In one method, a first type of score that increases with the degree of roundness is determined for each divided region and the region having the highest score is rated as the one that is the most characteristic of the pupil, namely, the red-eye region. Alternatively, the distance between the position of the center of gravity and the center position of the designated part is calculated for each divided region and a second type of score that increases as this distance decreases is determined for each region; the region having the highest score is rated as the one that is the most characteristic of the pupil, namely, the red-eye region.

In yet another method, the proportion of the area of the divided region of interest to the area of the designated part is determined for each divided region and a third type of score that decreases as the determined proportion is further outside a specified range such as the one of a predetermined proportion of the area of a pupil to that of the designated part is determined for each region; the region having the highest score is rated as the one that is the most characteristic of the pupil, namely, the red-eye region.

In still another method, at least one of the following factors, i.e., the mean value, the maximum value and the minimum value of at least one of three color elements, hue, saturation and lightness, as well as the contrast and the histogram shape, is determined and compared with preliminarily measured statistical information about a tone-defective region; a fourth type of score that increases as the characteristic of a particular region comes nearer to that of the tone-defective region is determined for each divided region and the region having the highest score is rated as the one that is the most characteristic of the pupil, namely, the red-eye region.

Alternatively, a fifth type of score may be determined in accordance with the center positions of pupils as preliminarily designated and the distance between the both eyes and this type of score decreases with the increasing distance from the center of pupil; the region having the highest score is rated as the one that is the most characteristic of the pupil, namely, the red-eye region.

If weighted averaging is taken by increasingly weighting the regions as they have increasing scores, the regions that get high score will apparently have increasingly higher score and vice versa; as a result, the difference in score is sufficiently increased that the region that is the most characteristic of the pupil can be clearly distinguished from the other regions.

Red eye detection involves several parameters including the characteristic quantity, as well as the threshold for dividing the image into a plurality of regions on the basis of the characteristic quantity, weight, and the score as a reference for choosing the red-eye region from the divided regions. Since these parameters including the threshold, weight and the characteristic quantity vary with such conditions as the input type, the camera model, the color space (processing region), the image processing in preliminary steps, the image format and the scan condition, they are altered in the present invention in accordance with such conditions as the input type, the camera model, the processing space, the image processing in preliminary steps, the image format and the scan condition, thereby ensuring more accurate detection of the red-eye region. For instance, the threshold and the characteristic quantity vary depending on the image format determined by bit depth (i.e., whether the image is in a, for example, 8-bit or 10-bit form), so these parameters are altered in accordance with the image format. In this case, the weight is the same.

Instead of using such conditions as the input type, the camera model, the processing space, the image processing in preliminary steps, the image format and the scan condition independently of one another, some of these conditions may be combined and the parameters altered in accordance with such combinations.

The parameters for red eye detection and correction are altered (set) in the condition setting unit 48.

Altering (setting) of the parameters in the condition setting unit 48 may be performed in such a manner that the reference parameters, for example, the standard parameters to be used as the references are previously provided as the parameters for red eye detection and correction and the parameter alteration is realized by transforming the reference parameters based on one of such conditions as the input type, the camera model, the processing space, the image processing in preliminary steps, the image format and the scan condition, or on a combination of such conditions. In that case, the transformational relationship (equation for transformation and amount of transformation) for the transformation of the reference parameters is set for each of the above conditions or each combination of the conditions.

If the condition for parameter alteration is the processing space (color space for processing image data) as shown in FIG. 4A, for example, the reference parameters may be set previously in the color space sRGB. In the case where the color space intended for processing is the one of the machine-specific print data (PD), the reference parameters set in the color space sRGB are transformed from the parameters in the color space sRGB to those in the color space PD, so that the parameter alteration is realized in accordance with the processing space.

To the transformation of the reference parameters from the parameters in the color space sRGB to those in the color space PD, namely the transformation of the processing space, various known procedures of color space transformation including those by look-up table (LUT) processing, matrix (MTX) processing, and so forth may be applied. In the case of the color space transformation by LUT or MTX processing, the transformation LUT or MTX is provided for each color space.

If the condition for parameter alteration is the image processing in preliminary steps and the processing of interest is gradation processing as shown in FIG. 4B, the reference parameters may be set under a standard gradation. In the case where the gradation intended for processing is a hard one, the reference parameters set under a standard gradation are transformed from the parameters under a standard gradation to those under a hard gradation, so that the parameter alteration is realized in accordance with the gradation processing.

Also to the transformation of the reference parameters from the parameters under a standard gradation to those under a hard gradation, namely the transformation of the gradation (transformation among standard, hard and soft gradations), various known procedures of gradation transformation including those by look-up table (LUT) processing, matrix (MTX) processing, and so forth may be applied. In that case also, the transformation LUT or MTX is provided for each gradation.

Altering (setting) of the parameters in the condition setting unit 48 is not limited to the examples as above; it may also be performed in such a manner that the parameters corresponding to all such conditions as the input type, the camera model, the processing space, the image processing in preliminary steps, the image format and the scan condition and to all combinations of such conditions are provided previously as the parameters for red eye detection and correction and the parameter alteration is realized by selecting the parameters corresponding to one of the conditions or a combination of the conditions.

In an exemplary case shown in FIG. 4C, the condition for parameter alteration is the processing space (color space for processing image data) and the parameters set in the color spaces in question such as the color space sRGB and the color space of machine-specific print data (PD) are all provided previously. The relevant parameters are selected from among the provided parameters corresponding to the color space intended for processing, the color space sRGB, PD or another, so that the parameter alteration is realized in accordance with the processing space.

If the condition for parameter alteration is the image processing in preliminary steps and the processing of interest is gradation processing, the parameters set under the gradations in question such as standard, hard and soft gradations are all provided previously, as shown in FIG. 4D. The relevant parameters are selected from among the provided parameters corresponding to the gradation intended for processing, a standard, hard or soft gradation, so that the parameter alteration is realized in accordance with the gradation processing.

It is also possible to use the two methods as described above in combination for the purpose of altering (setting) the parameter in the condition setting unit 48, one of which providing the reference parameters and the other the parameters for all cases. For instance, to any of such conditions as the input type, the camera model, the processing space, the image processing in preliminary steps, the image format and the scan condition or any combination of such conditions that is adopted more frequently, the method which provides the parameters for all cases may be applied and to any of such conditions or any combination of such conditions that is adopted less frequently, the method which provides the standard parameters to be used as the references may be applied.

In the next step, the detected red eye is corrected. If the person whose eyes come out red is actually dark-eyed, the saturation of the eye region is reduced so that it comes nearer to being achromatic, whereby the red-eye effect is corrected to dark eyes. If the person whose eyes comes out red is actually blue-eyed, a desired blue color is preliminarily designated and stored and hue conversion is effected to correct the red-eye effect to blue eyes.

In the embodiment under consideration, the pixels in the red eye region that has been chosen by the procedure described above are corrected on the basis of the pixels of minimum lightness such that the lightness of all pixels in the region becomes equal or gets nearer to the lightness of the pixels of minimum lightness.

Saturation is also corrected in the same way, i.e., to provide a match with the saturation of the pixels of minimum saturation. If a natural appearance can be assured, either lightness or saturation alone may be corrected.

According to another correction technique, a gradation pattern may be radially formed from the center of the corrected red eye region toward the periphery and tinted with designated colors such that the density decreases from the center outward. The selected colors may typically be chosen from among a maximum and a minimum density value that have been detected from the pupil in other regions that do not have the red-eye effect, a maximum and a minimum density value that have been adjusted from the first mentioned maximum and minimum density values, and a maximum and a minimum density value that are preliminarily specified by the user.

In red eye correction, the parameters that provide a measure for the amount by which the saturation of the red-eye region of an actually dark-eyed person should be reduced or for the degree by which the lightness of that region should be brought nearer to the lightness of the pixels of minimum lightness, as well as the parameters that represent the aforementioned gradation pattern are also altered, typically in accordance with the input type (depending upon whether an input image is from a negative or a positive film or from a digital camera).

To be more specific, as in red eye detection, the parameters such as the amount of correction of a characteristic quantity which are to be employed in red eye correction are altered in accordance with the input type, the camera model, the processing space, the image processing in preliminary steps, the image format, the scan condition, or the like. Again, some of these conditions may be combined and the aforementioned parameters altered in accordance with such combinations.

As a result, the red-eye effect can be corrected in a more appropriate manner and the user can perform unified red eye detection and correction without regard to the input type and so forth but by simply altering the parameters involved. This contributes to adopting red eye detecting and correcting software (modules) and hardware (image processing unit) that are common to various types of input images.

While the red eye detecting and correcting method of the present invention has been described above in detail with reference to various embodiments thereof, it should be understood that the invention is by no means limited to the foregoing embodiment and various improvements and modifications may of course be made without departing from the scope and spirit of the invention.

As described on the foregoing pages, the present invention enables red eye detection and correction to be performed in a unified way by simply altering the parameters involved in accordance with the type of an input image (input type), the processing space for image data (processing region), the image processing steps to be performed before red eye detection and correction (image processing in preliminary steps), the image format or the scan condition. This contributes to adopting red eye detecting and correcting software (modules) or hardware (image processing unit) that is common to various types of input images.

What is claimed is:

1. A red eye detecting and correcting method, comprising:
   detecting red eye that occurred in an image during photographing; and
   correcting the thus detected red eye to a specified color of pupil,
   wherein parameters employed in red eye detection and correction are altered in accordance with at least one of conditions as follows: type of said image, a camera model with which said image was recorded, a processing space for image data on said image, image processing steps to which said image is to be subjected before red eye detection and correction, format of said image, and scan condition; and wherein when a part of said conditions or a part of combinations of said conditions are adopted more frequently than another part of said conditions or another part of the combinations of said conditions, parameters corresponding to all said part of said conditions and all said part of the combinations of said conditions are provided as said parameters, and parameters corresponding to one among said part of said conditions or one among said part of the combinations of said conditions are selected as said parameters to be altered; and when another part of said conditions or a part of combinations of said conditions are adopted less frequently than another part of said conditions or another part of the combinations of said conditions, reference parameters for said another part of said conditions or said another part of the combinations of said conditions are provided as said parameters, and said parameters to be altered are obtained from said reference parameters by transformation based on one among said another part of said conditions or one among said another part of the combinations of said conditions.

2. The red eye detecting and correcting method according to claim 1, wherein said parameters are altered in accordance with a combination of two or more of said conditions.

3. The red eye detecting and correcting method according to claim 1, wherein:
reference parameters are provided as said parameters; and
said parameters to be altered are obtained from said reference parameters by transformation based on one of said conditions or a combination of two or more of said conditions.

4. The red eye detecting and correcting method according to claim 1, wherein:
parameters corresponding to all said conditions and all combinations of said conditions are previously provided as said parameters; and
parameters corresponding to one of said conditions or a combination of two or more of said conditions are selected as said parameters to be altered.

5. The red eye detecting and correcting method according to claim 1, wherein the processing space comprises alteration of red-eye factors based on color space, wherein
the image processing steps comprise alteration of red-eye factors based on gradation.

6. The red eye detecting and correcting method according to claim 5, wherein the parameters employed in red-eye detection are altered in accordance at least one of: camera model, color space, gradation, and scan condition.

7. The red eye detecting and correcting method according to claim 6, wherein said parameters are altered in accordance with a combination of two or more of said conditions.

8. The red eye detecting and correcting method according to claim 1, wherein said type of said image comprises a negative film.

9. The red eye detecting and correcting method according to claim 1, wherein said type of said image comprises a positive film.

10. The red eye detecting and correcting method according to claim 1, wherein said type of said image comprises a digital image.

11. The red eye detecting and correcting method according to claim 1, wherein said format of said image comprises the number of bits.

12. The red eye detecting and correcting method according to claim 1, wherein said scan condition comprises the number of times pixels are offset and coordination.

* * * * *